(12) United States Patent
Gil et al.

(10) Patent No.: US 8,285,337 B1
(45) Date of Patent: Oct. 9, 2012

(54) MOBILE ADVERTISING ON PERSONAL CELLULAR TELECOMMUNICATIONS DEVICES

(75) Inventors: Amit Gil, Yehud (IL); Uri Neria, Chofit (IL)

(73) Assignee: Celltick Technologies Ltd., Herzliya (IL)

( * ) Notice: Subject to any disclaimer, the term of this patent is extended or adjusted under 35 U.S.C. 154(b) by 0 days.

(21) Appl. No.: 13/530,350

(22) Filed: Jun. 22, 2012

Related U.S. Application Data

(63) Continuation of application No. 12/448,211, filed as application No. PCT/IL2007/000358 on Mar. 20, 2007, now Pat. No. 8,219,153.

(30) Foreign Application Priority Data

Jan. 4, 2007 (IL) .......................................... 180542

(51) Int. Cl.
*H04B 1/38* (2006.01)
(52) U.S. Cl. ................... 455/566; 455/550.1; 455/414.1; 455/414.3; 455/412.2; 455/466; 705/14.4; 705/14.55; 705/14.41

(58) Field of Classification Search ................. 705/14.4, 705/14.55, 14.41; 455/566, 466, 550.1, 414.1, 455/414.3, 412.2
See application file for complete search history.

(56) References Cited

U.S. PATENT DOCUMENTS

| | | | | |
|---|---|---|---|---|
| 7,039,423 | B2* | 5/2006 | Daniel et al. | ............... 455/456.3 |
| 8,219,153 | B2* | 7/2012 | Gil et al. | ........................ 455/566 |
| 2004/0078427 | A1* | 4/2004 | Gil et al. | ....................... 709/203 |
| 2008/0139224 | A1* | 6/2008 | Stone | ......................... 455/456.3 |

* cited by examiner

*Primary Examiner* — Ajit Patel
*Assistant Examiner* — Khai M Nguyen
(74) *Attorney, Agent, or Firm* — Pearl Cohen Zedek Latzer, LLP

(57) ABSTRACT

Mobile advertising on personal cellular telecommunications devices includes an initial Level 0 Interactive Display Message (IDM) having a content precursor for requesting additional content with or without a visual advertising component. Level 0 IDMs may be displayed as part of a user initiated client application or automatically replacing an idle screen. Mobile advertising can optionally include one or more Level 1 Advertisement Display Messages (ADMs) including text, graphics, video, and the like. Level 1 ADMs may be interactive or not.

37 Claims, 11 Drawing Sheets

MOBILE ADVERTISING ON PERSONAL CELLULAR TELECOMMUNICATIONS DEVICES

CROSS-REFERENCE TO RELATED APPLICATIONS

This application is a continuation application of U.S. patent application Ser. No. 12/448,211, filed Jun. 12, 2009 now U.S. Pat. No. 8,219,153, which is a National Phase Application of PCT International Application No. PCT/IL2007/000358, International Filing Date Mar. 20, 2007, which in turn claims priority from Israel Patent Application No. 180542, filed Jan. 4, 2007, all of which are incorporated herein by reference in their entirety.

FIELD OF THE INVENTION

The invention pertains to mobile advertising on personal cellular telecommunications devices. For the purpose of the present invention, the term "personal cellular telecommunications device" refers to a wide range of portable handheld electronic devices having small display screens and voice communications capabilities. The term "personal cellular telecommunications device" is intended to include inter alia radio telephones, smart phones, communicators, and the like.

BACKGROUND OF THE INVENTION

Cellular operators display Advertisement Display Messages (ADMs) on personal cellular telecommunications devices as a way of garnering additional revenue or charging subscribers less whilst making up the difference with advertising revenue, and naturally desire to charge as high rates as possible. ADMs displayed on personal cellular telecommunications devices include a visual component such as text or graphics and may be interactive for enabling a subscriber to request additional advertising information. ADMs may be downloaded in real time or alternatively they can be stored in a buffer. ADMs can be time sensitive and location sensitive, and also subscriber sensitive in accordance with a subscriber profile in terms of age, interests, etc.

Advertisers are prepared to pay premium rates for peak advertising time slots and prime advertising positions, for example, at the top of a page, a pop-up banner, and the like. Peak advertising time applies to displaying ADMs on personal cellular telecommunications devices in a similar manner to other advertising media. Against this, prime advertising positioning is hardly applicable to displaying ADMs on personal cellular telecommunications devices due to their small screen size. Moreover, advertisers are prepared to pay additional sums for ADMs which have been viewed to a high degree of certainty.

SUMMARY OF THE INVENTION

Applicant's PCT International Publication No. WO 01/52572, the contents of which are incorporated herein by reference, illustrates and describes a cellular telecommunications network capable of transmitting a multi-programming channel 24/7 cellular broadcasting service to a plurality of individually addressable BTSs each providing bidirectional signal coverage over a predefined geographical area ranging from so-called typically indoor pico cells each covering a few square meters through so-called micro cells each covering anywhere from a few tens to a few hundreds of square meters upto cells covering several square kilometers. The BTSs are each capable of transmitting Point-To-MultiPoint (PTMP) display messages and Point-To-Point (PTP) display messages for streaming mostly different content, mostly Interactive Display Messages (IDMs) on personal cellular telecommunications devices. The PTMP display messages are dispatched from a Point-To-MultiPoint Display Message Dispatcher and the PTP display messages are dispatched from a Point-To-Point Display Message Dispatcher. Both the PTMP display messages and the PTP display messages originate at a Display Message Input Entity. Programming can be selected by a Programming Channel Allocation Scheme.

WO 01/52572's FIG. 1 shows two exemplary successive time-sensitive IDMs displayed in a screen saver-like manner replacing a normally displayed idle screen. The IDMs include "NASDAQ DROPS 10% PRESS SND FOR DETAILS" display at 9:00 and "NASDAQ JUMPS 20%" displayed at 9:01. The 9:00 IDM is an example of an IDM prompting a subscriber as to the action required by him to obtain additional information from an information provider. Against this, the 9:01 IDM is an example of an IDM which does not prompt a subscriber as to which action is needed to take to obtain additional information since he is already cognizant of the fact that pressing the SND key will automatically connect him to a suitable information service. Activation of IDMs activates a point-to-point transmission response mechanism from the list of a: a voice call, an SMS, a data session, for example, an Internet browsing session, a SIM browsing session, and the like (see WO 01/52572's FIG. 2).

Applicant's market commercial implementations of the invention published under WO 01/52572 under the tradename LIVESCREEN™. Commercial LIVESCREEN™ implementations typically enable subscribers to select SMS, voice or WAP as the transport bearer of requested additional content. Subscribers typically select their preferred transport bearer from a suitable options menu.

The present invention is directed towards mobile advertising on personal cellular telecommunications devices. The mobile advertising includes an initial IDM having a content precursor with or without a visual advertising component. IDMs may be displayed as part of a user initiated client application or automatically replacing an idle screen. The mobile advertising optionally includes one or more ADMs including text, graphics, video, and the like. The present invention takes into consideration perceived subscriber attitudes regarding mobile advertising and their expectations regarding the operation of their personal cellular telecommunications devices, and also handset specifications, for example, whether a handset supports dual softkey response mechanisms for enabling a subscriber to select one option of two optional device operations. One such consideration is the intended intrusiveness of mobile advertising, namely, to what degree are subscribers prepared to be exposed to advertising which depends on several factors, for example, whether a subscriber has solicited the advertising or not, his usage profile, his age, and the like. Subscribers are typically prepared to solicit advertising for discounts on calls, SMSs, and other cellular services.

The present invention proposes restrictions for limiting mobile advertising to avoid subscriber discontent. Restrictions may be defined per IDM or be uniform over a predetermined period of time. Restrictions may be personalized per individual subscriber or groups of subscribers. Restrictions may be set from a subscriber's handset or by Over The Air (OTA) instructions from the network side. OTA instructions may be incorporated in IDMs themselves by the provision of suitable fields. Restrictions can include inter alia controlling the display time of individual ADMs, the number of ADMs, the delay time between a subscriber requesting additional content and displaying the requested additional content, or a combination of any of the above.

Transitions between display images including IDMs, non-interactive ADMs, interactive ADMs for requesting detailed advertising information, and the like, may be automatic or require subscriber interaction, for example, depressing a response softkey, scrolling down, and the like. Invoking interactive ADMs can lead to placing a call to a call center, displaying a WAP page, displaying a SMS, displaying another interactive ADM, transmitting a request for a call center to call the subscriber, transmitting a request for a link to be forwarded to the subscriber's email address, and displaying a menu listing at least two of aforesaid response mechanisms.

IDMs and ADMs can be delivered over the same PTMP or PTP delivery channel. Alternatively, IDMs can be delivered over a PTMP delivery channel and ADMs over a PTP delivery channel, or vice versa. More personalized display messages irrespective of whether they are IDMs or ADMs are better suited for delivery over a PTP delivery channel. Conversely, more generic display messages are better suited for delivery over a PTMP delivery channel.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF PREFERRED EMBODIMENTS OF THE INVENTION

Figure 1:
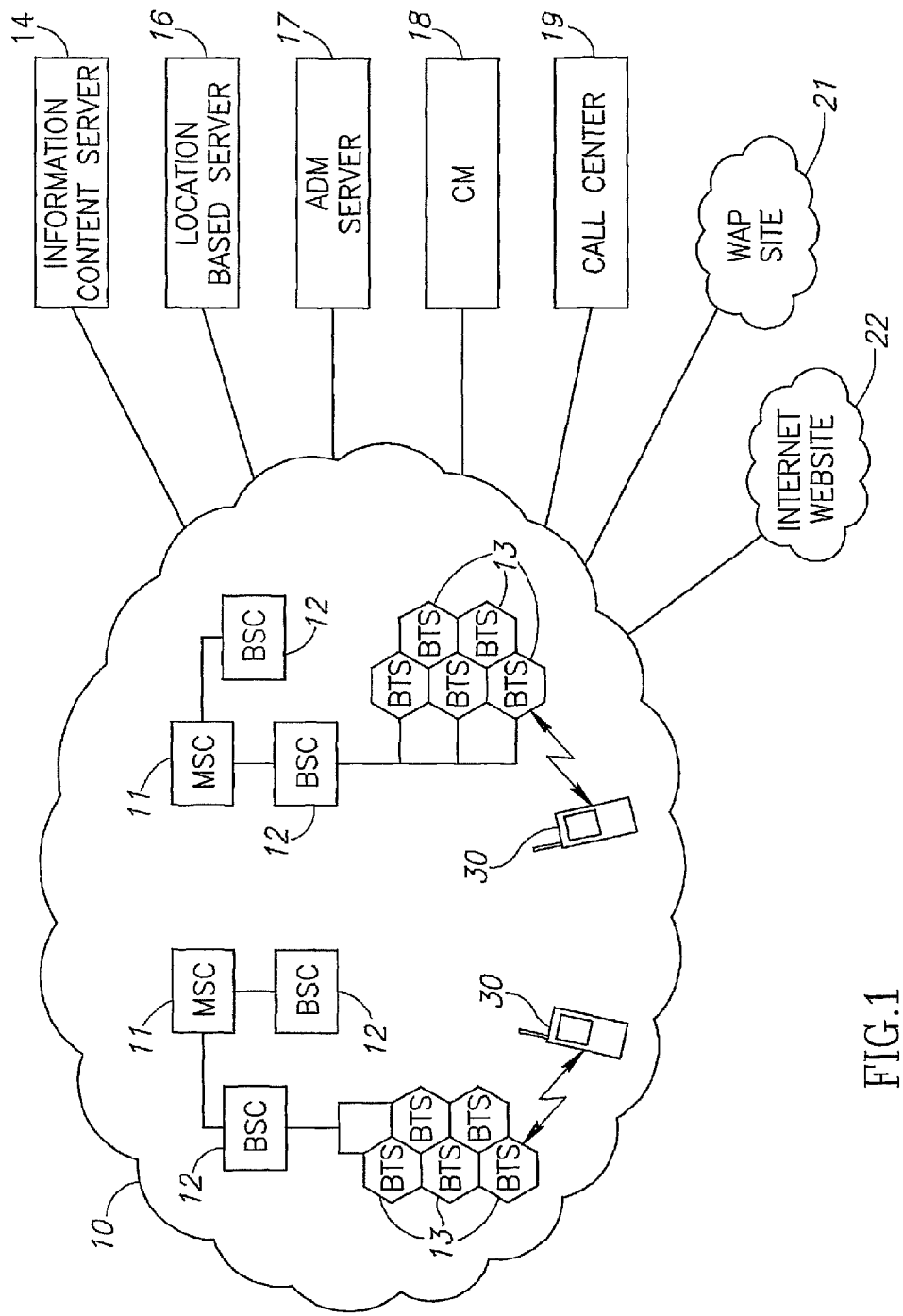
FIG. 1 is a schematic representation of a system for mobile advertising on personal cellular telecommunications devices in accordance with the present invention.

FIG. 1 shows a cellular telecommunications network 10 including a plurality of MSCs 1, a plurality of BSCs 12, and a plurality of individually addressable BTSs 13 for streaming content to personal cellular telecommunications devices (hereinafter abbreviated to "devices") 30. The devices 30 include inter alia simple handset phones, smartphones, combined PDA/phones, combined MP3 music players/phones, and the like. GSM devices 30 include a host Mobile Equipment (ME) 31, and a resident Subscriber Identity Module (SIM) card 32 (see FIG. 3). The host ME 31 has its own unique vendor allocated 15 digit International Mobile Equipment Identification (IMEI) number, for example, 490548400308362. The SIM card 32 has a cellular operated allocated 15 digit International Mobile Subscriber Identity (IMSI) number, for example, 425010100437187.

The cellular telecommunications network 10 includes an Information Content Server (ICS) 14 for displaying Level 0 IDMs on the devices 30, and additional content associated therewith for display on demand as requested by subscribers. The IDMs include at least one response mechanism for continuing device operation including displaying additional content, for example, by browsing to a WAP page, and the like. The ICS 14 can be fed by a Location Based Server (LBS) 16 for providing location based IDMs and associated additional content. IDMs are preferably transmitted over a PTMP delivery channel due to bandwidth considerations whilst their respective additional content is typically transmitted over a PTP delivery channel to the subscribers requesting same. IDMs can also be transmitted over a PTP delivery channel.

The cellular telecommunications network 10 also includes an Advertisement Display Message (ADM) Server 17 for providing ADMs for display on the devices 30. ADMs can be non-interactive or interactive to provide additional advertising information to subscribers. ADMs are also preferably transmitted over a PTMP delivery channel due to bandwidth considerations but they also may be transmitted over a PTP delivery channel. ADMs can be transmitted individually or in batches of two or more ADMs.

The cellular telecommunications network 10 preferably includes a Campaign Manager (CM) 18 for assisting operators to run campaigns and programs, and to analyze subscriber behavior regarding both IDMs and ADMs. The CM 18 may also provide information for billing purposes.

The cellular telecommunications network 10 is connected to a call center 19 for enabling subscribers to receive further details regarding advertisements which they are interested in, ordering products and services, and the like. The cellular telecommunications network 10 is also connected to a WAP site 21, and the Internet 22.

Figure 2:
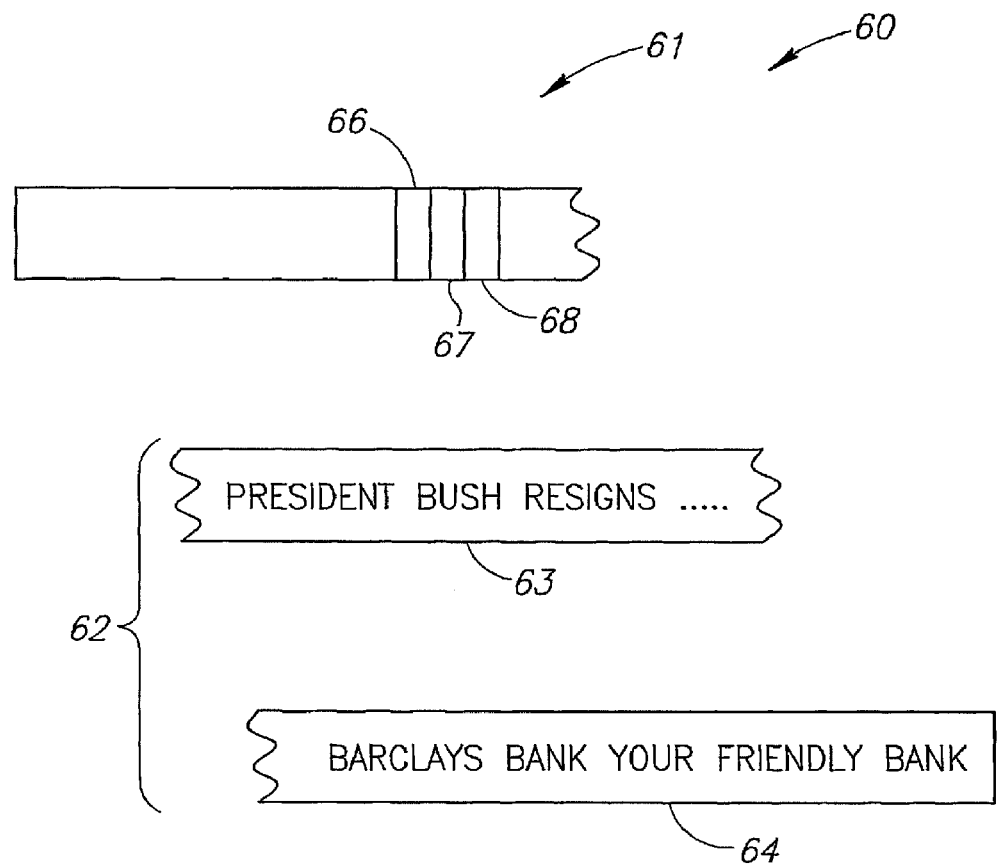
FIG. 2 is a schematic representation of a Level 0 IDM including a header portion and a payload portion including a content precursor, and a visual advertising component.

FIG. 2 shows an IDM 60 including a header portion 61, and a payload portion 62 including a content precursor 63, for example, "President Bush resigns . . . " to be displayed on devices 30. The payload portion 62 may optionally include visual advertising components, for example, an advertising phrase 64 "Barclays Bank your friendly bank" for displaying together with the content precursor 63 in the same display image. The header portion 61 may include a DISPLAY TIME field 66 for determining the maximum duration the IDM 60 is to be displayed on devices 30. The header portion 61 may include a MAX TIME DELAY field 67 for determining a maximum time delay for displaying mobile advertising from invoking an IDM for displaying the additional content associated with its content precursor, and displaying the additional content. The MAX TIME DELAY field 67 can accept values in the range from 0 to, say, 30 seconds. The value 0 precludes displaying ADMs after invoking an IDM. The value 30 means that possibly one or two ADMs can be displayed between an IDM's initial display and displaying its additional contents.

The header portion 61 may include a MAX ADM field 68 for determining a maximum number of ADMs to be displayed before displaying requested additional content associated with a content precursor. The MAX ADM field 68 can accept values in the range from 0 to, say, 5. The value 0 precludes displaying ADMs between an IDM's initial display and displaying the additional contents associated with its content precursor. The value 5 means that upto five ADMs can be displayed between an IDM's initial display and displaying its additional contents.

Figure 3:
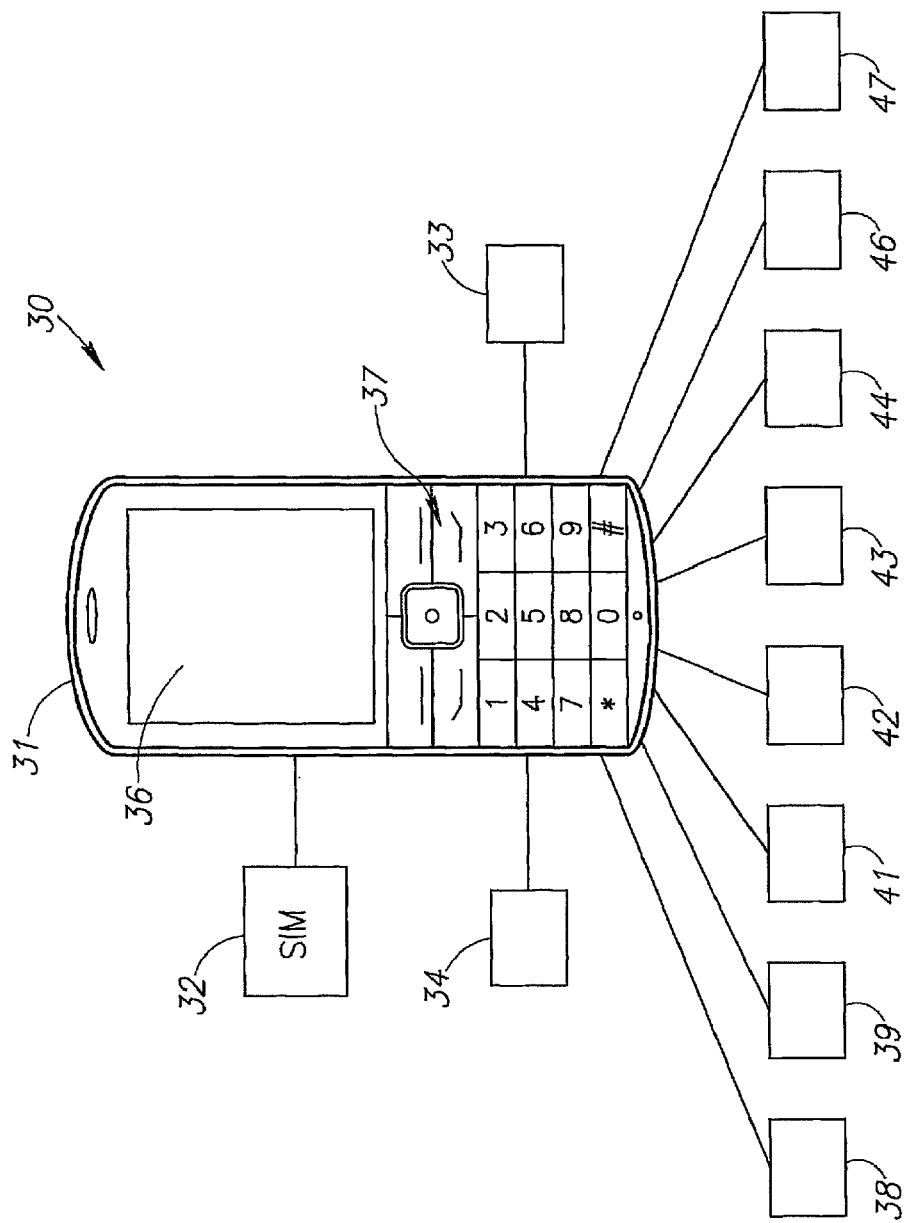
FIG. 3 is a schematic representation of a personal cellular telecommunications device in accordance with the present invention.

FIG. 3 shows the devices 30 include a cellular network interface 33 for bi-directional interfacing with the cellular telecommunications network 10, an operating system 34 in communication with the cellular network interface 33, a display screen 36, a user interface 37 for inputting instructions, and a memory unit 38 with a buffer 39 for storing visual advertising components for insertion in IDMs, and discrete ADMs. The devices 30 include a Mobile Advertising Selection Module (MASM) 41 for selecting visual advertising components and ADMs from the buffer 39 for display purposes in accordance with a selection scheme, and a Mobile Advertising Deletion Module (MADM) 42 for deleting visual advertising components and ADMs from the buffer 39 in accordance with a deletion scheme. The devices 30 preferably include a Subscriber Content Filter (SCF) 43 for storing a subscriber's individual content filters for preventing unwanted content from being displayed thereon.

The devices 30 preferably includes a register 44 for receives values limiting the maximum durations of IDMs on devices 30. The register 44 receives values from the network side, the subscriber's handset by means of a suitable user interface, or IDMs' DISPLAY TIME field 66. The devices 30 preferably includes a register 46 for receiving values limiting the delay time between a subscriber requesting additional content associated with a content precursor, and displaying the requested additional content. The register 46 receives values from the network side, the subscriber's handset by means of a suitable user interface, or IDMs' MAX TIME DELAY field 67. The operating system 34 interrupts displaying Level 1 ADMs to display additional content on elapsing of the maximum time delay. The devices 30 also preferably include a register 47 for receiving values limiting the number of Level 1 ADMs between a subscriber requesting additional content associated with a content precursor, and displaying the requested additional content. The register 47 receives values from the network side, the subscriber's handset by means of a suitable user interface, or IDMs' MAX ADM field 68. The operating system 34 interrupts displaying Level 1 ADMs to display additional content after displaying the maximum number of Level 1 ADMs.

Figure 4:
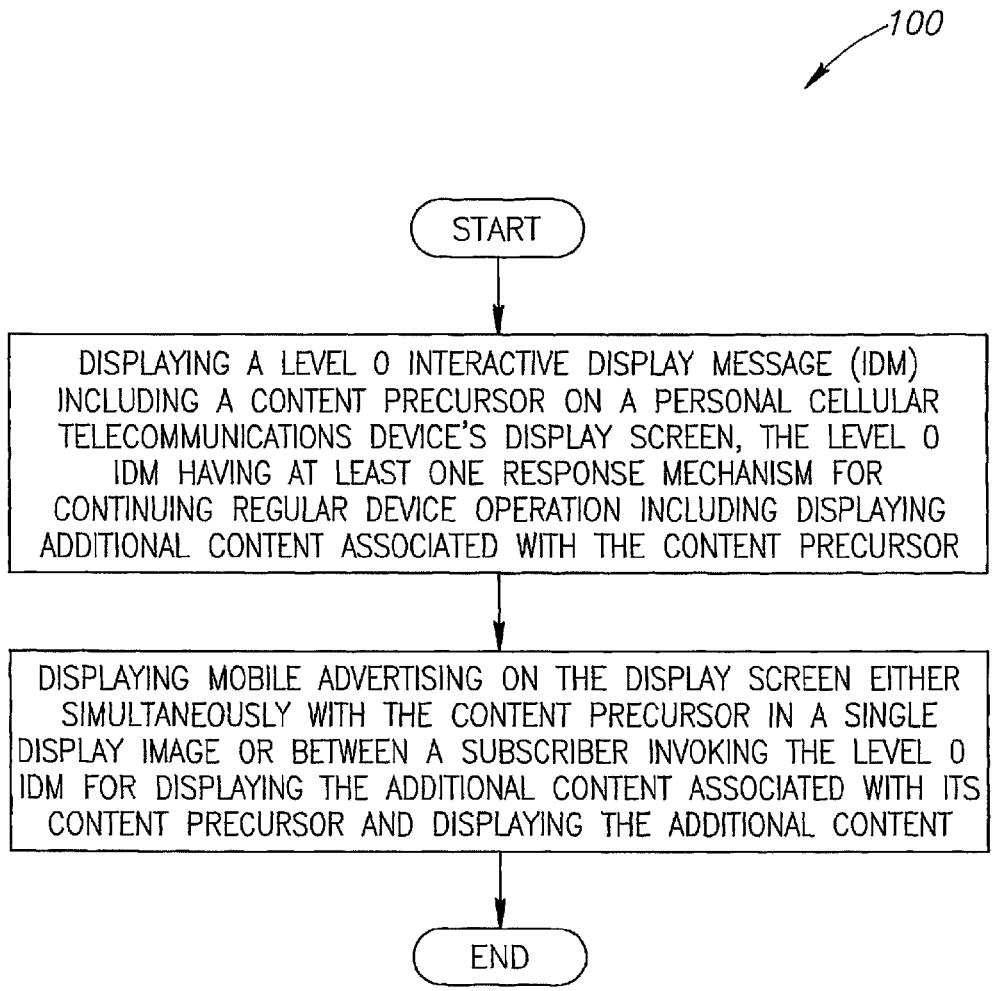
FIG. 4 is a flow chart of the top level methodology of mobile advertising on personal cellular telecommunications devices in accordance with the present invention.

FIG. 4 shows a top level methodology 100 of mobile advertising on devices 30 in accordance with the present invention. The methodology includes the cellular telecommunications network 10 transmitting Level 0 IDMs including content precursors with or without visual advertising components for display on devices 30. Subscribers wishing to display additional content associated with Level 0 IDMs' content precursors invoke same. Mobile advertising may be displayed during the waiting time between subscribers requesting additional content or not as the case may be. In the event that Level 0 IDMs include a visual advertising component, subscribers may wish to immediately obtain detailed advertising information associated with same. In the case of interactive ADMs, subscribers can request detailed advertising information associated therewith thereby overriding an original request for additional content. Detailed methodologies of mobile advertising on devices are described hereinbelow with reference to FIGS. 18 to 20.

FIGS. 5 to 17 are schematic representations of three Level 0 IDMs (FIGS. 5 to 7) and ten lower level display images including additional content, non-interactive and interactive ADMs, interactive option menus, and the like. The Level 0 IDMs and lower level display images include softkey responses labeled OK, SKIP, MORE DETAILS, and the like, for apprising subscribers regarding continuing regular device operation. The labels appearing in the specification are for illustrative purposes only and are not to be construed to limit the scope of the present invention.

Figure 7:
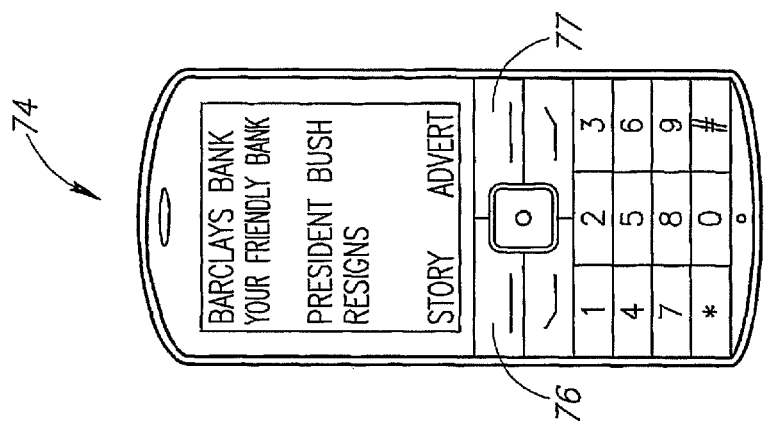
FIG. 7 is a schematic representation of a personal cellular telecommunications device displaying a Type III Level 0 IDM with the content precursor "President Bush resigns . . . ", the advertising phrase "Barclays Bank your friendly bank", a response softkey STORY for requesting additional content associated with the IDM's content precursor, and a response softkey ADVERT for requesting advertising information associated with the IDM's advertising phrase.
Figure 6:
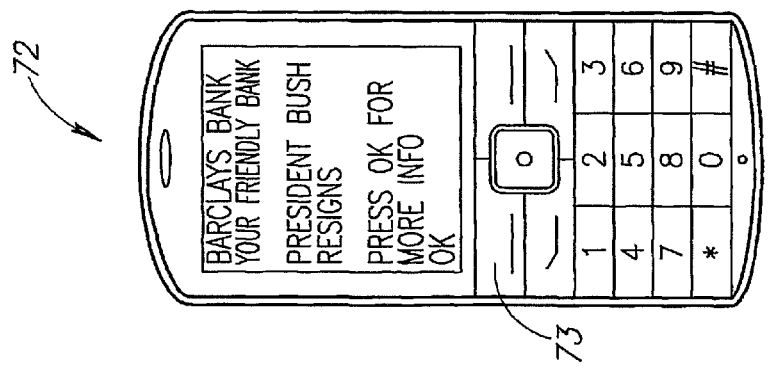
FIG. 6 is a schematic representation of a personal cellular telecommunications device displaying a Type II Level 0 IDM with the content precursor "President Bush resigns . . . ", an advertising phrase "Barclays Bank your friendly bank", and a single response softkey OK for requesting additional content associated with the IDM's content precursor.
Figure 5:
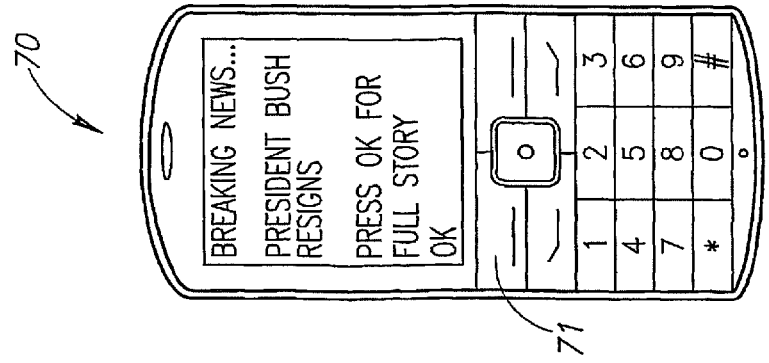
FIG. 5 is a schematic representation of a personal cellular telecommunications device displaying a Type 1 Level 0 IDM with a content precursor "President Bush resigns . . . " and a single response softkey OK for requesting additional content associated with the IDM's content precursor.
Figure 11:
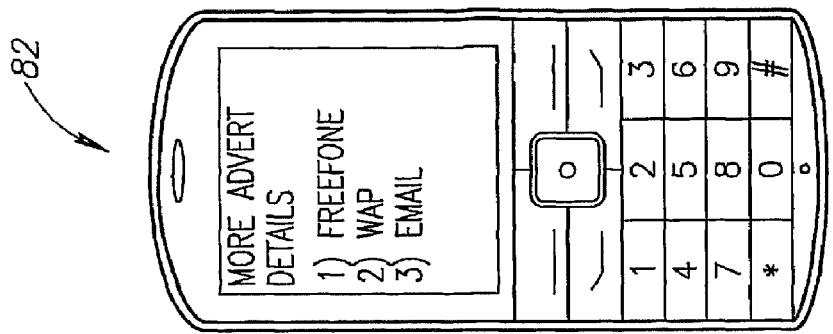
FIG. 11 is a schematic representation of a personal cellular telecommunications device displaying an interactive options menu for enabling a subscriber to select his preferred mode of obtaining advertising information.
Figure 10:
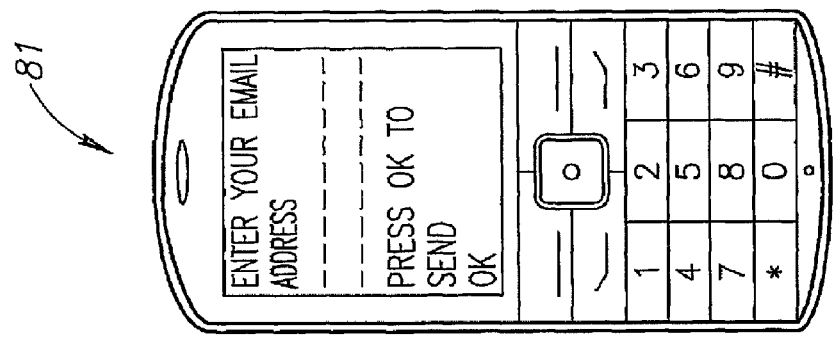
FIG. 10 is a schematic representation of a personal cellular telecommunications device displaying an IDM which a subscriber has to manually complete with his email address.
Figure 9:
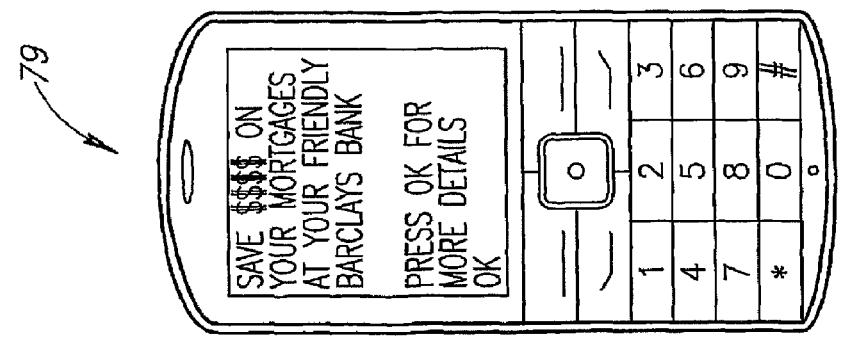
FIG. 9 is a schematic representation of a personal cellular telecommunications device displaying advertising information associated with either FIG. 6's or FIG. 7's Level 0 IDMs' advertising phrase "Barclays Bank your friendly bank"

FIG. 5's display image shows a Type I Level 0 IDM 70 with the content precursor "President Bush resigns . . . ", without a visual advertising component, and with a single response softkey OK 71. FIG. 6's display image shows a Type II Level 0 IDM 72 with the same content precursor "President Bush resigns . . . ", an advertising phrase "Barclays Bank your friendly bank", and a single response softkey OK 73 for continued device operation. FIG. 7's display image shows a Type III Level 0 IDM 74 with the same content precursor and advertising phrase as the Type II Level 0 IDM 72, and dual response softkeys including a first response softkey STORY 76 for displaying additional content associated with the content precursor and a second response softkey ADVERT 77 for requesting detailed advertising information associated with the advertising phrase. The advertising phrases in Type II Level 0 IDMs 72 and Type III Level 0 IDMs 74 can be retrieved from the buffer 39 in accordance with the MASM 41 whereupon they are displayed simultaneously therewith. Alternatively, the advertising phrases can be transmitted with Level 0 IDMs either over a PTMP or PTP delivery channel.

Figure 8:
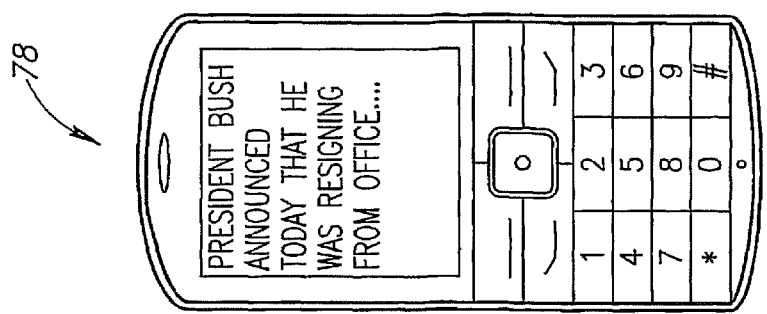
FIG. 8 is a schematic representation of a personal cellular telecommunications device displaying requested additional content associated with one of FIG. 5, FIG. 6 or FIG. 7's Level 0 IDMs' content precursor "President Bush resigns . . . "

FIG. 8's display image shows requested additional content 78 associated with Level 0 IDMs 70, 72 and 74's content precursor "President Bush resigns . . . ". Providing detailed advertising information to a subscriber on invoking the softkey response ADVERT 77 includes one of the following: loading a WAP page 79 (see FIG. 9), initiating a call to a call center, displaying an interactive ADM, transmitting a request that a service provider will send additional information over SMS or MMS, transmitting a request that a service provider forward a link to a subscriber's email address, and the like. A subscriber's email address may be pre-stored at a cellular operator, or may be a default email address pre-stored in his personal cellular telecommunications device or he may be required to manually complete an IDM 81 with his email address (see FIG. 10). Alternatively, invoking the response softkey ADVERT 77 may lead to displaying an interactive options menu 82 for enabling a subscriber to select his preferred mode of obtaining detailed advertising information (see FIG. 11).

Figure 14:
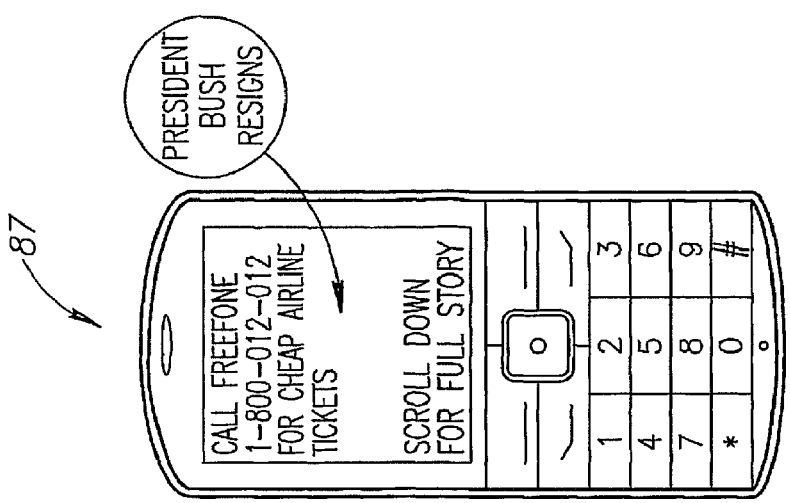
FIG. 14 is a schematic representation of a personal cellular telecommunications device displaying a Type III Level 1 non-interactive ADM requiring a subscriber to manually scroll down or wait for a timeout to continue regular device operation.
Figure 13:
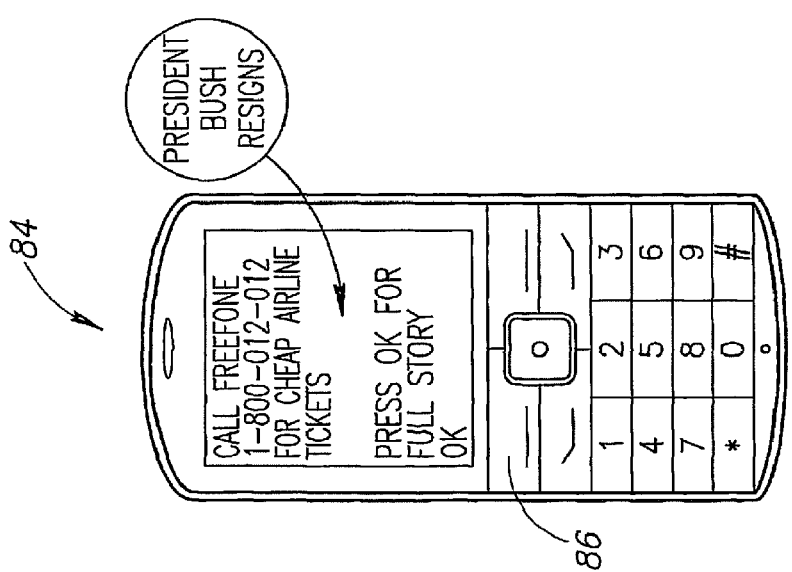
FIG. 13 is a schematic representation of a personal cellular telecommunications device displaying a Type II Level 1 non-interactive ADM requiring subscriber interaction or waiting for a timeout to continue regular device operation.
Figure 12:
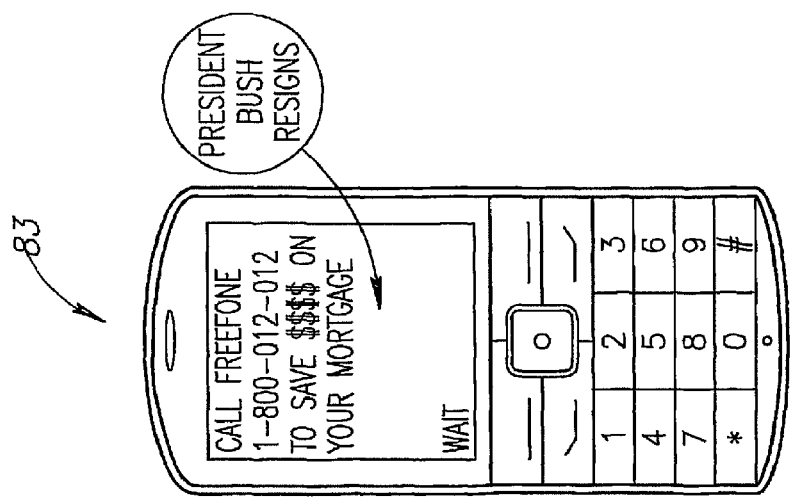
FIG. 12 is a schematic representation of a personal cellular telecommunications device displaying a Type I Level 1 non-interactive ADM waiting for a timeout to continue regular device operation.

FIG. 12's display image shows a Type I Level 1 non-interactive ADM 83 requiring a subscriber to wait for a timeout for continuing regular device operation. ADM 83 can optionally include a user instruction "WAIT" and/or the content precursor of a Level 0 IDM 70, 72 or 74. FIG. 13's display image shows a Type II Level 1 non-interactive ADM 84 requiring subscriber interaction typically in the form of a click or waiting for a timeout for continuing regular device operation. ADM 84 can optionally include a user instruction "Press OK for full story" and/or the content precursor of a Level 0 IDM 70, 72 or 74. FIG. 14's display image shows a Type III Level 1 non-interactive ADM 87 requiring a subscriber to manually scroll down or wait for a timeout for continuing regular device operation. ADM 87 can optionally include a user instruction "Scroll down for full story" and/or the content precursor of a Level 0 IDM 70, 72 or 74. Regular device operation including, for example, displaying another ADM can be achieved by any one of several transition mechanisms including inter alia automatic scrolling, full screen replacement, and the like.

Figure 16:
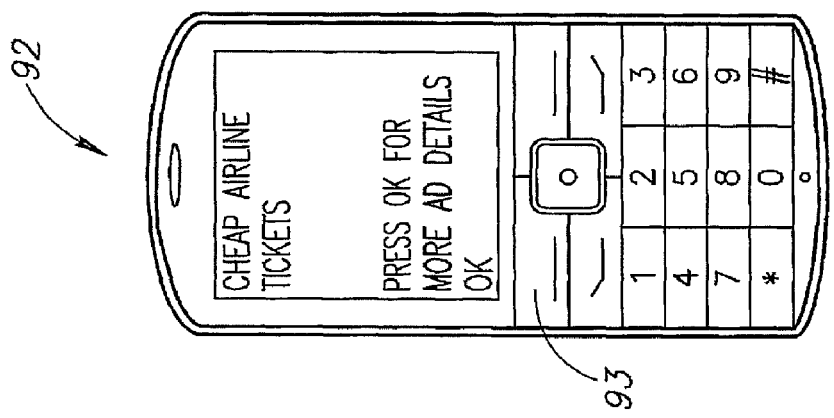
FIG. 16 is a schematic representation of a personal cellular telecommunications device displaying a Type V Level 1 interactive ADM with a single response softkey OK for requesting advertising information associated therewith.
Figure 15:
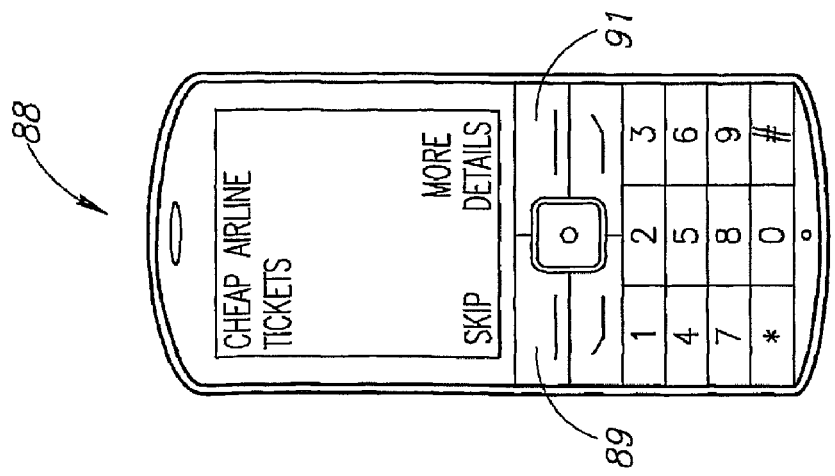
FIG. 15 is a schematic representation of a personal cellular telecommunications device displaying a Type IV Level 1 interactive ADM with a response softkey SKIP to continue regular device operation and a response softkey MORE DETAILS for requesting advertising information associated therewith.

FIG. 15's display image shows a Type IV Level 1 interactive ADM 88 including a first response softkey SKIP 89 for continuing regular device operation and a second response softkey MORE DETAILS 91 for requesting detailed advertising information whereupon, on a subscriber invoking the response softkey MORE DETAILS 91, the subscriber is immediately provided with detailed advertising information associated with ADM 88. ADM 88 can optionally include the content precursor of a Level 0 IDM 70, 72 or 74. FIG. 16's display image shows a Type V Level 1 interactive ADM 92 including a response softkey OK 93 for requesting detailed advertising information associated therewith whereupon, on a subscriber invoking the response softkey OK 93, the subscriber is immediately provided with detailed advertising information associated therewith.

Invoking the response softkeys MORE DETAILS 91 and OK 93 provides detailed advertising information to the subscriber in a similar manner as in the case of invoking the response softkey ADVERT 77. But invoking the response softkeys MORE DETAILS 91 and OK 93 provides detailed advertising information associated with the ADMs 88 and 92 and not as shown on WAP page 79 which is associated with the Level 0 IDM 74's advertising phrase "Barclays Bank your friendly bank". Thus, in the case of invoking the response softkeys MORE DETAILS 91 and OK 93, an exemplary WAP page may show cheap return air flights from Heathrow to major European cities.

Figure 17:
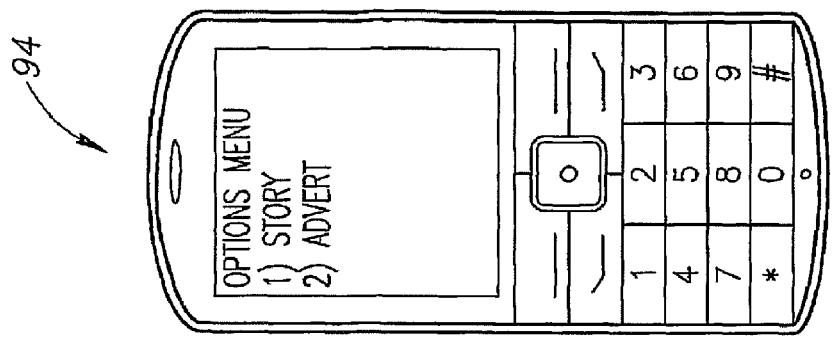
FIG. 17 is a schematic representation of a personal cellular telecommunications device displaying an interactive options menu for enabling a subscriber to select STORY for additional content or ADVERT for advertising information associated with FIG. 6's Level 0 IDM's content precursor and advertising phrase, respectively.

FIG. 17's display image shows an optional interactive options menu 94 in the case of starting at a FIG. 6's Type I Level 0 IDM 72 for enabling a subscriber to select STORY for additional content associated with the content precursor "President Bush resigns . . . " or ADVERT for detailed advertising information associated with its advertising phrase "Barclays Bank your friendly bank".

Figure 18:
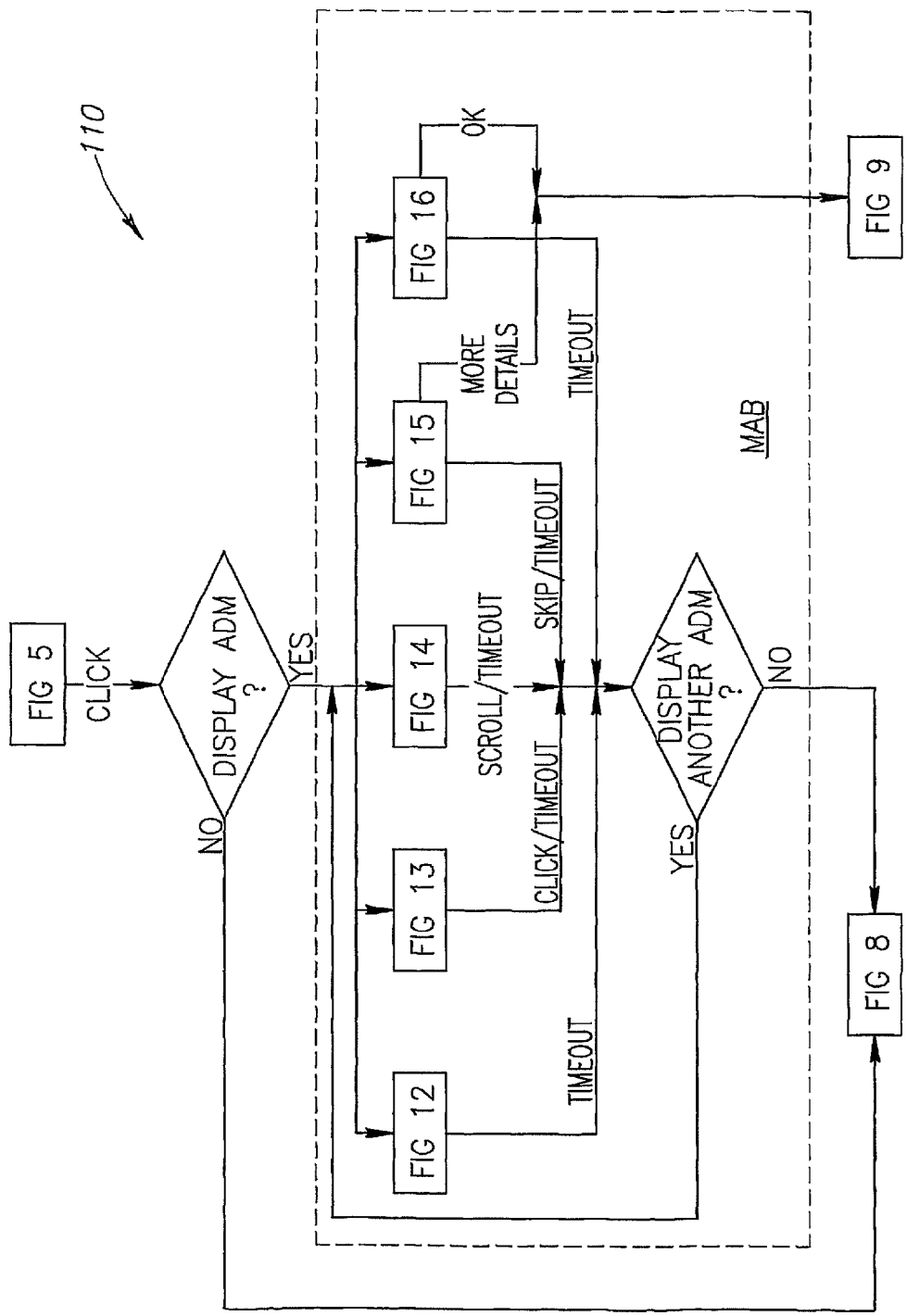
FIG. 18 is a flow chart of the methodology of mobile advertising on a personal cellular telecommunications device starting at a FIG. 5's Type I Level 0 IDM.

FIG. 18 shows a methodology 110 of mobile advertising on devices 30 starting at a Type I Level 0 IDM 70 in which case a subscriber has to view at least one Level 1 ADM before he can request detailed advertising information. On invoking a Type I Level 0 IDM, a device 30 determines whether to display mobile advertising or not based on several factors including inter alia day of week, time of day, user preferences or profile, the values stored in registers 46 and 47, and the like. In the affirmative, a device 30 displays one of the Level 1 ADMs 83, 84, 87, 88 and 92 in a Mobile Advertising Block (MAB). In the case of displaying one of ADMs 88 and 92, and invoking either ADM 88's response softkey 91 MORE DETAILS or ADM 92's response softkey OK 93, a subscriber is immediately provided with the detailed advertising information as requested. Otherwise a device 30 reverts to continuing regular device operation, and determines whether to continue to display mobile advertising or not.

Figure 19:
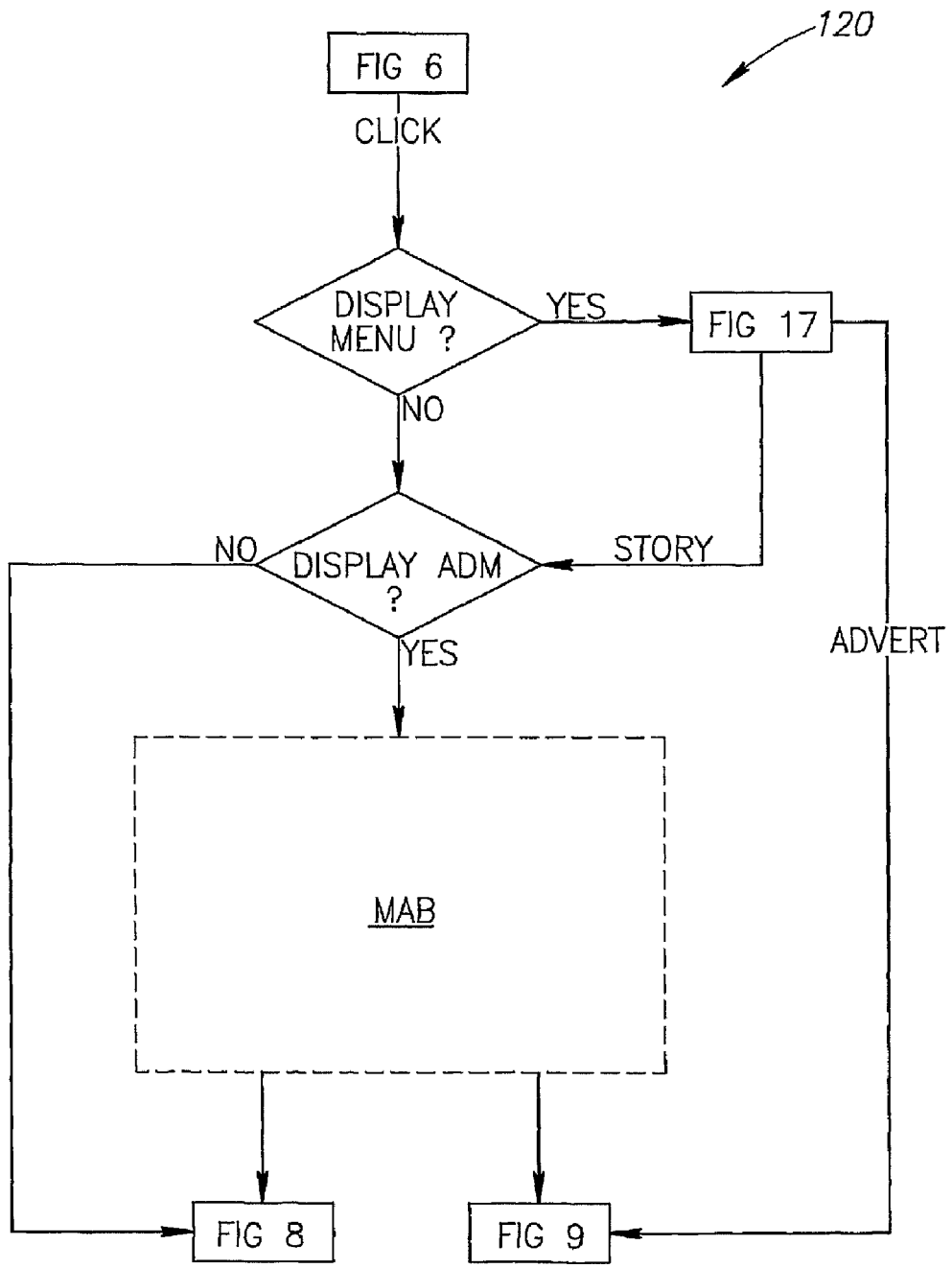
FIG. 19 is a flow chart of the methodology of mobile advertising on a personal cellular telecommunications device starting at a FIG. 6's Type II Level 0 IDM.

FIG. 19 shows a methodology 120 of mobile advertising on devices 30 starting at a FIG. 6's Type II Level 0 IDM 72. The methodology 120 is similar to the methodology 110 and also includes the mobile advertising block MAB. The methodology 120 differs from the methodology 110 insofar that a Type II Level 0 IDM 72 includes a visual advertising component either transmitted therewith or retrieved from the buffer 39 for simultaneous display purposes. Moreover, invoking a Type II Level 0 IDM 72 may lead to displaying the interactive options menu 94 whereupon a subscriber can decide he immediately wants detailed advertising information associated with the originating Type II Level 0 IDM 72's advertising phrase "Barclays Bank your friendly bank" as opposed to the additional content associated with its content precursor "President Bush resigns . . . ".

Figure 20:
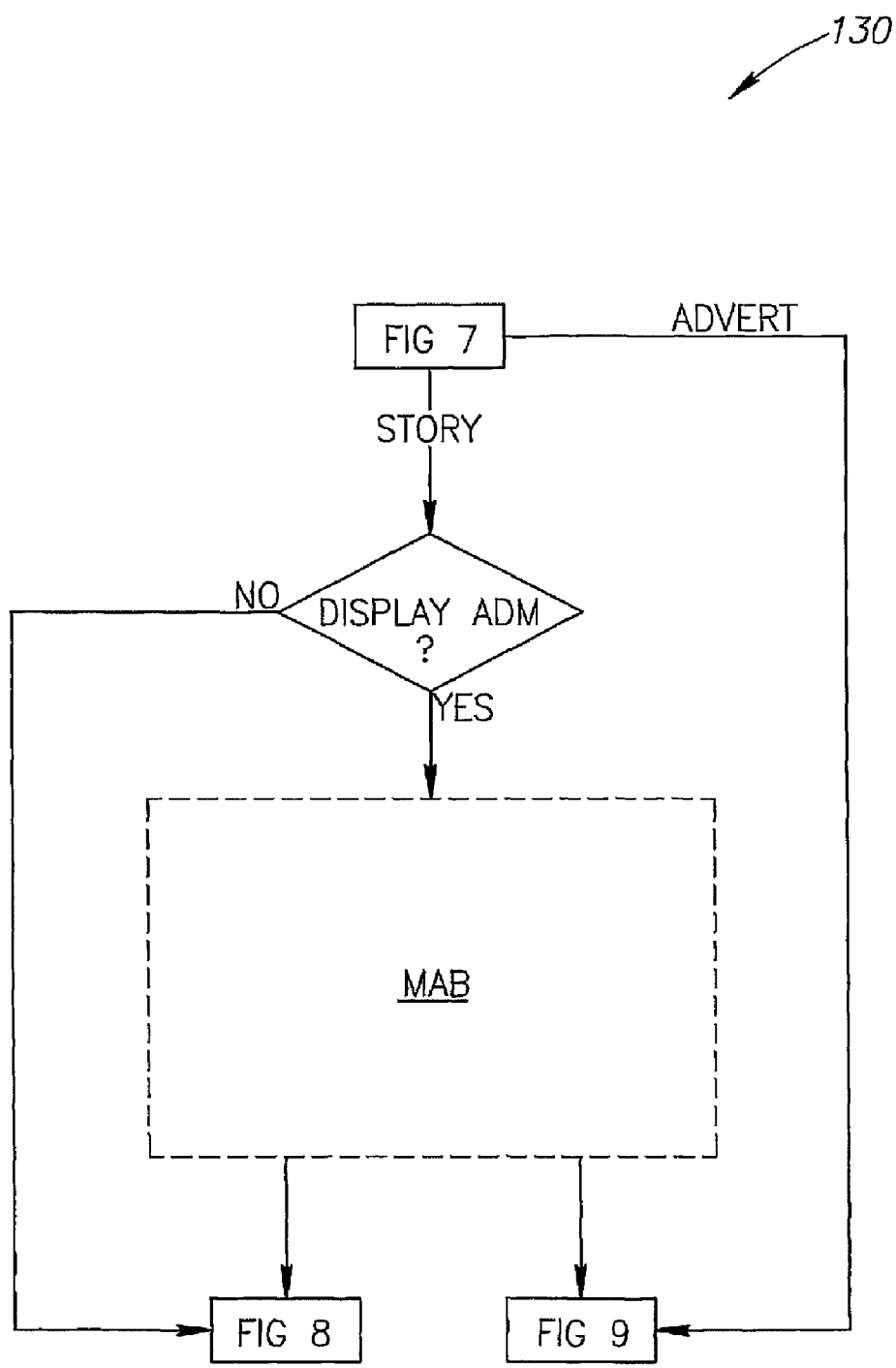
FIG. 20 is a flow chart of the methodology of mobile advertising on a personal cellular telecommunications device starting at a FIG. 7's Type III Level 0 IDM.

FIG. 20 shows a methodology 130 of mobile advertising on devices 30 starting at a FIG. 7's Type III Level 0 IDM 74. The methodology 130 is similar to the methodology 110 and also includes the mobile advertising block MAB. The methodology 130 differs from the methodology 110 insofar that a Type III Level 0 IDM 74 includes a visual advertising component either transmitted therewith or retrieved from the buffer 39 for simultaneous display purposes. Moreover, a subscriber may invoke the response softkey ADVERT 77 to directly obtain detailed advertising information associated with its advertising phrase "Barclays Bank your friendly bank".

While the invention has been described with respect to a limited number of embodiments, it will be appreciated that many variations, modifications, and other applications of the invention can be made within the scope of the appended claims. For example, whilst the present invention has been described in parts with reference to its GSM implementation, it is suitable for implementation by both existing or still evolving technologies including inter alia PCS, GPRS, 3G, CDMA, UMTS, W-CDMA, CDMA2000 and the like, and/or both existing and still evolving services including inter alia MBMS, OMA BCAST, OMA DCD, DVB-H, DMB, and the like.

The invention claimed is:

1. Method for mobile advertising on a personal cellular telecommunications device having a display screen, the method comprising the steps of:
   (a) displaying a Level 0 interactive display message including a content precursor on the display screen, the Level 0 interactive display message having at least one response mechanism for continuing regular device operation including displaying additional content associated with the content precursor;
   (b) displaying mobile advertising on the display screen either simultaneously with the content precursor in a single display image or between a subscriber invoking the Level 0 interactive display message for displaying the additional content associated with its content precursor and displaying the additional content;
   (c) on a subscriber invoking the Level 0 interactive display message, displaying a Level 1 interactive advertisement display message including a visual advertising component, and an advertisement-request response mechanism for requesting advertising information associated therewith; and
   (d) on a subscriber invoking said advertisement-request response mechanism, providing the advertising information to the subscriber.

2. The method as claimed in claim 1 wherein the Level 0 interactive display message additionally includes a visual advertising component.

3. The method as claimed in claim 2 whereupon, on a subscriber invoking a single response mechanism, displaying an interactive options menu including a first response mechanism for continuing regular device operation and a second response mechanism for requesting advertising information associated with the visual advertising component, whereupon, on a subscriber invoking the second response mechanism, providing the advertising information to the subscriber.

4. The method as claimed in claim 2 wherein the Level 0 interactive display message includes a second response mechanism for requesting advertising information associated with the visual advertising component whereupon, on a subscriber invoking the second response mechanism, immediately providing the advertising information to the subscriber.

5. The method as claimed in claim 2 wherein the visual advertising component is retrieved from a buffer of visual advertising components.

6. The method as claimed in claim 2 wherein the Level 0 interactive display message includes the visual advertising component.

7. The method as claimed in claim 2 wherein the Level 0 interactive display message is a PTMP message and the visual advertising component is a PTP message.

8. The method as claimed in claim 2 wherein the Level 0 interactive display message is a PTP message and the visual advertising component is a PTMP message.

9. The method as claimed in claim 2 wherein immediately providing advertising information to a subscriber includes at least one of the following:
   (a) displaying a WAP page;
   (b) displaying a SMS or MMS;
   (c) placing a call to a call center,
   (d) displaying another interactive display message;
   (e) transmitting a request for a call center to call the subscriber,
   (f) transmitting a request for a link to be forwarded to the subscriber's email address; and
   (g) displaying a menu listing at least two of aforesaid response mechanisms.

10. The method as claimed in claim 9 where a subscriber manually completes his email address prior to transmitting the request for a link to be forwarded to the subscriber's email address.

11. The method as claimed in claim 1 wherein a Level 0 interactive display message includes an instruction regarding its display time on a display screen.

12. The method as claimed in claim 1 wherein a Level 1 advertisement display message includes a user instruction for continuing regular device operation.

13. The method as claimed in claim 1 wherein a Level 1 interactive advertisement display message further includes a continue-request response mechanism for continuing regular device operation.

14. The method as claimed in claim 1 wherein a Level 1 advertisement display message includes the content precursor of its originating Level 0 interactive display message.

15. The method as claimed in claim 1 wherein a Level 1 advertisement display message does not advertise the same product or service as its originating Level 0 interactive display message.

16. The method as claimed in claim 1 wherein a Level I advertisement display message is retrieved from a buffer of advertisement display messages.

17. The method as claimed in claim 1 wherein a Level I advertisement display message is transmitted subsequent to the interactive display message.

18. The method as claimed in claim 1 wherein a Level I advertisement display message includes an instruction regarding its display time.

19. The method as claimed in claim 1 wherein the interactive display message is a PTMP message and a Level 1 advertisement display message is a PTP message.

20. The method as claimed in claim 1 wherein the interactive display message is a PTP message and a Level 1 advertisement display message is a PTMP message.

21. The method as claimed in claim 1 wherein a Level 0 interactive display message scrolls down to a Level 1 advertisement display message.

22. The method as claimed in claim 1 wherein a Level 1 advertisement display message replaces a Level 0 interactive display message.

23. The method as claimed in claim 1 wherein, on a subscriber invoking a Level 0 interactive display message to display the additional content associated with its content precursor, displaying at least one Level 1 advertisement display message before displaying the additional content associated with the content precursor and interrupting displaying the at least one Level 1 advertisement display message after a predetermined time delay from the invoking of the Level 0 interactive display message.

24. The method as claimed in claim 1 wherein, on a subscriber invoking a Level 0 interactive display message to display the additional content associated with its content precursor, displaying at least one Level 1 advertisement display message before displaying the additional content and interrupting displaying the at least one Level 1 advertisement display message after displaying a predetermined number of Level 1 advertisement display messages from the invoking of the Level 0 interactive display message.

25. System for mobile advertising on a personal cellular telecommunications devices comprising:
   a personal cellular telecommunications device having a display screen, said personal cellular telecommunications device capable of:
   (a) displaying a Level 0 interactive display message including a content precursor on the display screen, the Level 0 interactive display message having at least one response mechanism for continuing regular device operation including displaying additional content associated with the content precursor;
   (b) displaying mobile advertising on the display screen either simultaneously with the content precursor in a single display image or between a subscriber invoking the Level 0 interactive display message for displaying the additional content associated with its content precursor and displaying the additional content;
   (c) on a subscriber invoking the Level 0 interactive display message, displaying a Level 1 interactive advertisement display message including a visual advertising component and an advertisement-request response mechanism for requesting advertising information associated therewith; and
   (d) on a subscriber invoking said advertisement-request response mechanism, providing the advertising information to the subscriber.

26. The system of claim 25, wherein the Level 0 interactive display message additionally includes a visual advertising component.

27. The system of claim 25, wherein the Level 0 intermediate display message includes an instruction regarding its display time on a display screen.

28. The system of claim 25, wherein the Level 1 advertisement display message includes a continue-request user instruction for continuing regular device operation.

29. The system of claim 25, wherein the Level 1 advertisement display message includes the content precursor of its originating Level 0 interactive display message.

30. Personal cellular telecommunications device comprising:
   (a) a cellular network interface for bi-directional interfacing with a cellular telecommunications network; and
   (b) an operating system in communication with said cellular network interface and operative for displaying mobile advertising, said operating system capable of:
   (a) displaying a Level 0 interactive display message including a content precursor on a display screen of the personal cellular telecommunications device, the Level 0 interactive display message having at least one response mechanism for continuing regular device operation including displaying additional content associated with the content precursor;
   (b) displaying mobile advertising on the display screen either simultaneously with the content precursor in a single display image or between a subscriber invoking the Level 0 interactive display message for displaying the additional content associated with its content precursor and displaying the additional content;
   (c) on a subscriber invoking the Level 0 interactive display message, displaying a Level 1 interactive advertisement display message including a visual advertising component and an advertisement-request response mechanism for requesting advertising information associated therewith; and
   (d) on a subscriber invoking said advertisement-request response mechanism, providing the advertising information to the subscriber.

31. The device as claimed in claim 30 and further comprising a register for storing the maximum duration of the display of an interactive display message.

32. The device as claimed in either claim 30 and further comprising a register for storing a maximum time delay for displaying at least one Level 1 advertisement display message after a subscriber invokes a Level 0 interactive display message for displaying the additional content associated with its content precursor and displaying the additional content whereupon said operating system interrupts displaying the at least one Level 1 advertisement display message to display the additional content on elapse of the maximum time delay.

33. The device as claimed in claim 30 and further comprising a register for storing a maximum number of Level 1 advertisement display messages to be displayed between a subscriber invoking a Level 0 interactive display message requesting the additional content associated with its content precursor and displaying the additional content whereupon said operating system interrupts displaying said at least one Level 1 advertisement display messages to display the additional content on displaying of said maximum number of Level 1 advertisement display messages.

34. The personal cellular telecommunications device of claim 30, wherein the Level 0 interactive display message additionally includes a visual advertising component.

35. The personal cellular telecommunications device of claim 30, wherein the Level 0 interactive display message includes an instruction regarding its display time on a display screen.

36. The personal cellular telecommunications device of claim 30, wherein the Level 1 advertisement display message includes a continue-request user instruction for continuing regular device operation.

37. The personal cellular telecommunications device of claim 30, wherein the Level 1 advertisement display message includes the content precursor of its originating Level 0 interactive display message.

\* \* \* \* \*